March 19, 1968     J. ZATZ     3,374,161
EXTERNAL COULOMETRIC GENERATOR

Filed Oct. 28, 1964     2 Sheets-Sheet 1

INVENTOR.
JULES ZATZ
BY
*TE Kristoffersen*
ATTORNEY

March 19, 1968          J. ZATZ          3,374,161

EXTERNAL COULOMETRIC GENERATOR

Filed Oct. 28, 1964          2 Sheets-Sheet 2

INVENTOR.
JULES ZATZ

ATTORNEY

United States Patent Office 3,374,161
Patented Mar. 19, 1968

3,374,161
EXTERNAL COULOMETRIC GENERATOR
Jules Zatz, Fullerton, Calif., assignor to Beckman Instruments, Inc., a corporation of California
Filed Oct. 28, 1964, Ser. No. 407,099
6 Claims. (Cl. 204—195)

ABSTRACT OF THE DISCLOSURE

An external coulometric reagent generator for use in a process titrator, for example, including vertical electrode wires on the face of the membrane for reducing opposition to the flow of the electrolyte, a parallel upward path in the electrolyte flow-stream prior to the path leading up into the generator to permit the escape of entrapped air bubbles, and a hydrophobic filter arranged to expel any gas flowing upward through the vertical conduits and to block the flow of electrolyte.

---

This invention relates to an external coulometric reagent generator for use in apparatus such as a process titrator, and more particularly to such a generator having improved means to clear the interfaces of the generating electrodes for uniform flow of electrolyte thereover and therethrough.

In the prior art, any air leaking through the electrolyte delivery pump, which pumps the electrolyte into the generating cell, passes through the cell with resulting increased resistance across the generating electrodes. This results in irregularities in the flow rate through the membranes associated with the generating electrodes, which flow rate is dependent upon the height of the electrolyte in a standpipe and the condition of the membranes, as well as in variations in electrode resistance. Also, the customary electrode shape is a spiral shape, which results in irregularities in the flow rate due to capillary action around the closely wound spirals, retardation of downward flow of the generated electrolyte reagent and blocking of upward flow of generated gases by the horizontal portions of the wire of the spiral electrode. Accordingly, it is an object of the invention to provide an external coulometric generator having means for maintaining an unobstructed flow through the generating electrode membranes.

Another object of the invention is to provide such a generator having means for by-passing any air leaking through the electrolyte pump.

Still another object of the invention is to provide an external coulometric generator having a hydrophobic filter means for allowing the escape of stray air and against which a constant pressure may be built up for application against the generating electrode membranes.

Yet another object of the invention is to provide an external coulometric generator in which the porosity of the membranes is not as critical a factor in establishing a given pressure at the membrane.

A further object of the invention is to provide an electrode structure for a coulometric generator which will not retard electrolyte, reagent or generated gas flow from the surface of the electrode.

A still further object of the invention is to increase the useful life of the membranes in an external coulometric generator.

In carrying out the invention in one form thereof, an external coulometric reagent generator is provided having an electrode structure in which the conductive protions of the electrode structure constitute vertical wires, joined at the top by a common cross wire and connected to a source of potential, together with an electrolyte feed means in which the flow of electrolyte from the pump upward through the generating cell conduit is shunted by a vertical conduit prior in the flow path to the point at which the electrolyte enters the generating cell, in order to cause any air bubbles to flow upward through the shunt. The top side of the cell and the shunt are then fed into a chamber which contains a hydrophobic filter which will not permit water to pass but will permit air bubbles or gas bubbles to escape therethrough. The pump then will build up a constant pressure against the membranes associated with the generating electrodes by building up pressure against the hydrophobic filter and holding the pressure at a fixed head.

An alternative embodiment might have separate hydrophobic filters in each vertical conduit.

The novel features which are believed to be characteristic of the invention are set forth with particularity in the appended claims. The invention itself, however, together with further objects and advantages thereof, can best be understood by reference to the following description, taken in connection with the accompanying drawings, in which:

Figure 1:
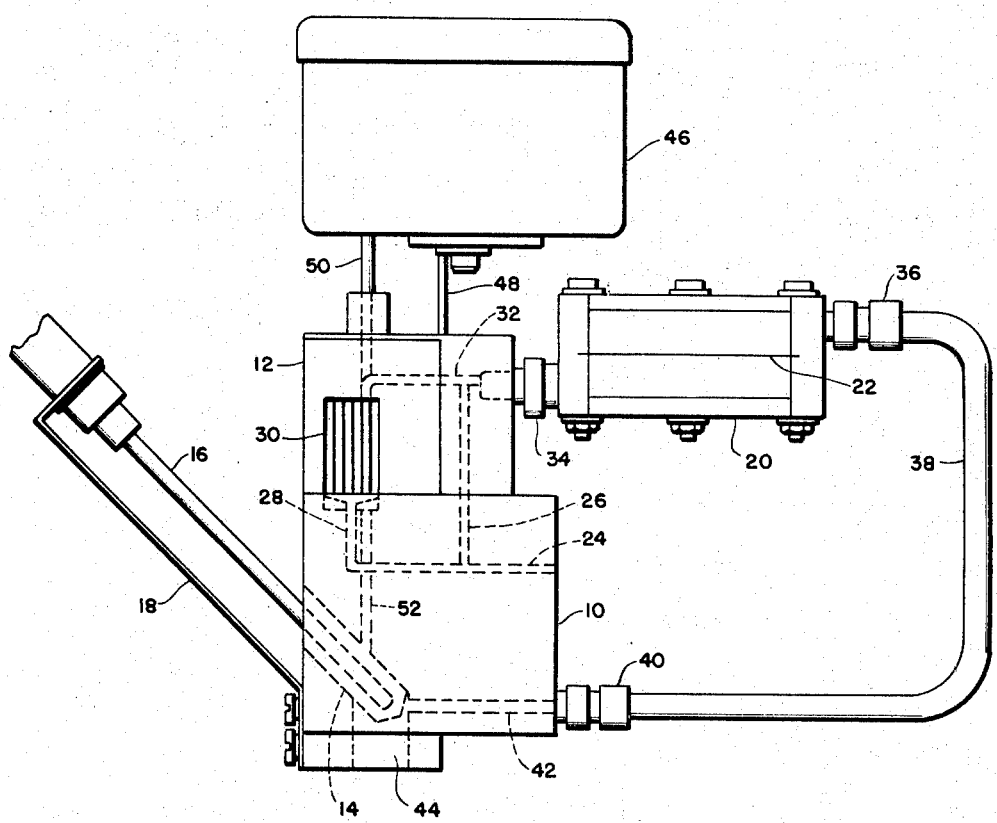
FIG. 1 is a side view of a coulometric generator incorporating the features of the invention.

Turning now to the drawings, in FIG. 1, illustrating a side view of an external coulometric generator constructed in accordance with the invention, the generator has a body portion 10 having a reagent generating cell block 12 mounted on top of it. Body portion 10 contains a sensing chamber 14 into which a pH sensing electrode 16 may be inserted. Electrode 16 may be mounted as by means of a bracket 18 on the side of body portion 10. A filter chamber 20 is mounted on the right side of the block 12 and is shown with its front face off to illustrate the location of the hydrophobic filter 22.

The internal piping for the flow of electrolyte and sample is as follows. Electrolyte is pumped into conduit 24 by means of an electrolyte delivery pump (not illustrated). A vertical shunt conduit 26 extends upward from conduit 24 at a point in conduit 24 prior to its vertical section 28 which extends upward into the generating cell 30. The electrolyte can flow up either shunt 26 or up conduit 28 and through cell 30 into a conduit 32 and through a fitting 34 into the lower portion of chamber 20 below hydrophobic filter 22, through which under normal conditions only gas will pass.

The portion of chamber 20 above hydrophobic filter 22 is connected by means of a fitting 36 to a transparent conduit or tube 38 which is connected back into body portion 10 by means of a fitting 40 to a conduit 42 which leads to the lower portion of the chamber 14 and to the conduit 44 leading in turn to waste.

A motor housing 46 is mounted on a bracket 48 to body portion 10 and contains a motor (not illustrated) which will turn a drill rod 50 which extends downward through a conduit 52 into chamber 14, and serves to mix sample and generated reagent before it drips from conduit 52 onto pH sensing electrode 16.

Figure 2:
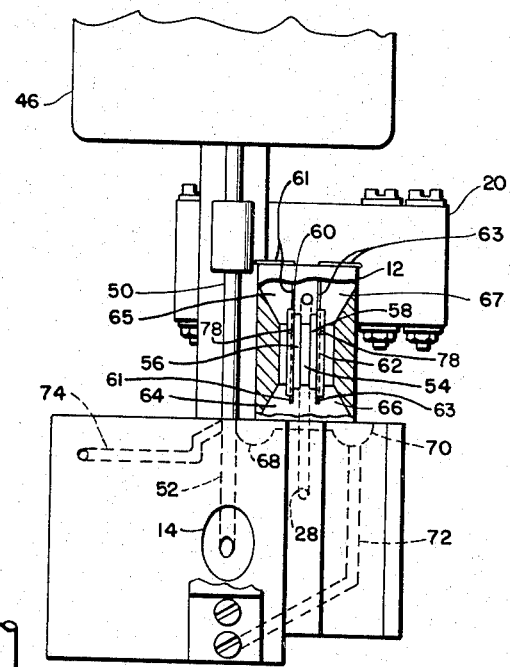
FIG. 2 is an end view, looking at the left end of the generator of FIG. 1, with the generating cell portion broken open to expose the cell structure.
Figure 3:
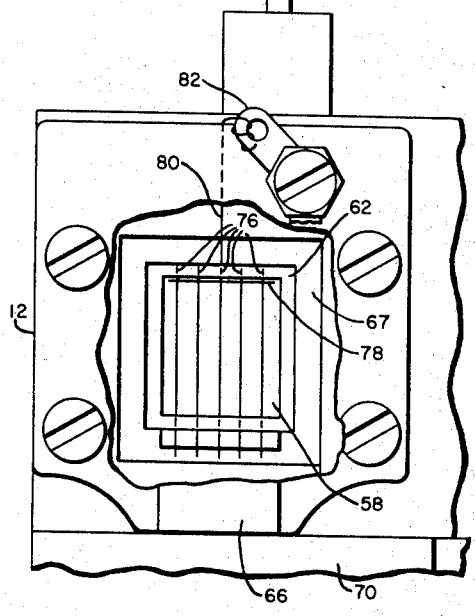
FIG. 3 is an enlarged side view of the generating cell portion of the generator of FIG. 1, broken open to show the electrode structure.

Turning now to FIG. 2 where similar parts have been designated with the same numerals as in FIG. 1, we can see the conduit 28 leading up into the center portion 54 of the generating cell in block 12. Adjacent each side of center portion 54 lies a porous membrane, 56 and 58, through which the electrolyte may flow. On the outside of membranes 56 and 58 lie two rubber gaskets 60 and 62, in which the electrode structures 61 and 63 are inserted, positioned against membranes 56 and 58 as is better illustrated in FIG. 3. Gasket compressors 65 and 67 hold the electrode structures securely in gaskets 60 and 62, respectively.

The electrolyte in center portion 54 flows through the membranes 56 and 58 across the electrodes 61 and 63 and down the inclines 64 and 66 in compressors 65 and 67 into troughs 68 and 70, respectively. The external surfaces of membranes 56 and 58 around electrodes 61 and 63 are exposed to the atmosphere to allow any generated gas to escape freely. Trough 70 is drained by means of conduit 72 which leads to waste conduit 44. The generated reagent to be used flows from trough 68 to the top of conduit 52. Also connected to the top of conduit 52 is another conduit 74 through which the sample to be titrated is pumped by means of a sample pump (not illustrated). The two flow together down through the conduit 52 and are mixed by the drill rod 50 before entering the chamber 14.

Thus, any gas bubbles which may be pumped into the conduit 24 will rise up through the vertical conduit 26 before entering the vertical portion 28 and going into the center portion 54 of the generating cell 30. The air bubbles will then flow through fitting 34 into the chamber 20, and will pass through the hydrophobic filter 22. Filter 22 may be, for example, a millipore filter, non-wettable to water. Since the water will not pass through the filter 22, the pump pumping the electrolyte into conduit 24 will build up a constant pressure against the filter 22 and a resulting constant presure or head across the membranes 56 and 58 which wil create a constant flow rate therethrough. If the membrane should become clogged, the electrolyte will be forced through the filter 22 and will enter the transparent tube 38. Appearance of electrolyte in tube 38 is an indication that the membranes should be changed or checked.

Turning now to FIG. 3, where again like parts are designated by identical numerals, the generating cell block 12 is illustrated with a section of its outside face removed in order to see the structure of the electrode more clearly. The electrode is constructed of a number of vertical wires 76 having a horizontal cross wire 78 interconnecting them and being connected in turn through the lead 80 to a terminal 82. The membrane 58 lies behind the electrode wires 76 which are flush up against it, held by the gasket 62.

Thus the electrolyte under pressure is forced through the membrane 58 where it comes in contact with the electrode wires 76, generating a reagent as a result of a potential applied across the terminal 82 and a corresponding terminal (not illustrated) associated with the membrane 56 and gasket 60. The electrolyte and generated reagent then flows down the face of membrane 58 past the wires 76 and onto the inclined portion 66 to the trough 70. As previously mentioned, the prior art electrode structures were in the form of a spiral. The electrode of the invention is constructed of a number of vertical wires. Thus the vertical wires facilitate the flow of electrolyte and generated reagent straight down the face of the electrode membrane, minimizing the effects of capillary action causing the fluid to stick to the electrode wire and preventing the capture of gas and of liquid above or below horizontal sections of electrode wire, with a resultant more even flow of electrolyte and generated reagent, through the generating cell.

While a particular embodiment of the invention has been described, it will be understood of course that it is not intended to limit the invention thereto since many modifications may be made, and that it is therefore contemplated by the appended claims to cover any such modifications as fall within the true spirit and scope of the invention.

What is claimed is new and desired to be secured by Letters Patent of the United States is:

1. In an external coulometric reagent generator having a reagent generating cell including a center portion with two porous membranes as sides, the combination comprising:
   a substantially horizontal electrolyte entry conduit through which electrolyte is pumped into said cell;
   two substantially vertical conduits, one connected from said entry conduit up into said center portion, and the other a shunt connected upward from a point in said entry conduit prior in the electrolyte flow path to said one;
   hydrophobic filter means arranged to pass gas flowing upward through said vertical conduits and said center portion and to block the further upward flow of electrolyte whereby a regulated pressure head may be developed against said filter for application against said membranes to cause said electrolyte to flow therethrough; and,
   electrode structure on the external surface of at least one of said membranes comprising a plurality of vertical conductive wires adjacent said one membrane joined at a point off the face of said membrane and connected in turn to a terminal.

2. In an external coulometric reagent generator having a reagent generating cell including a center portion with two porous membranes as sides, the combination comprising:
   a substantially horizontal electrolyte entry conduit through which electrolyte is pumped into said cell;
   two substantially vertical conduits, one connected from said entry conduit up into said center portion, and the other a shunt connected upward from a point in said entry conduit prior in the electrolyte flow path to said one;
   a common conduit connecting the top of said center portion and said shunt to a filter chamber;
   a hydrophobic filter connected in said chamber to pass gas flowing upward through said vertical conduits and said center portion and to block the further upward flow of electrolyte; and
   electrode structure on the external surface of said membranes comprising a plurality of vertical conductive wires adjacent each of said membranes exposed to the atmosphere, the vertical wires on each of said membranes being joined at the top and connected together and to a separate terminal.

3. In an external coulometric reagent generator having a reagent generating cell including a center portion with two porous membranes as sides, the combination comprising:
   a substantially horizontal electrolyte entry conduit through which electrolyte is pumped into said cell;
   two substantially vertical conduits, one connected from said entry conduit up into said center portion, an the other a shunt connected upward from a point in said entry conduit prior to the electrolyte flow path to said one; and
   hydrophobic filter means arranged to pass gas flowing upward through said vertical conduits and said center portion and to block the further upward flow of electrolyte whereby any air bubbles entering said entry conduit with said electrolyte will flow upward and out through said hydrophobic filter.

4. In an external coulometric reagent generator having a reagent generating cell including a center portion with two porous membranes as sides, the combination comprising:
   a substantially horizontal electrolyte entry conduit through which electrolyte is pumped into said cell;
   two substantially vertical conduits, one connected from said entry conduit up into said center portion, and the other a shunt connected upward from a point in said entry conduit prior in the electrolyte flow path to said one;
   a common conduit connected from the top of said center portion and said shunt to a chamber; and
   a hydrophobic filter means connected in said chamber to pass gas flowing upward through said vertical conduits and said center portion and to block the further upward flow of electrolyte whereby a regulated pressure head may be developed against said filter for application against said membranes to cause said electrolyte to flow therethrough at a controlled rate.

5. In an external coulometric reagent generator having a reagent generating cell including a center portion with two porous membranes as sides, the combination comprising:

electrode structure on the external surface of at least one of said membranes comprising a plurality of vertical conductive wires adjacent said one membrane joined at a point off the face of said membrane by a common conductive cross wire and connected in turn to a terminal, whereby electrolyte flowing through said membrane can flow freely down the outer surface of the membrane unobstructed by any horizontal electrode structure and generated gas may pass freely upward.

6. In an external coulometric reagent generator having a reagent generating cell including a center portion with two porous membranes as sides, the combination comprising:

electrode structure on the external surface of said membranes comprising a plurality of vertical conductive wires adjacent each of said membranes exposed to the atmosphere, the vertical wires on each of said membranes being joined at the top and connected together and to a separate terminal.

References Cited

UNITED STATES PATENTS

| | | | |
|---|---|---|---|
| 3,244,607 | 4/1966 | Leonard et al. | 204—195 |
| 3,244,608 | 4/1966 | Strickler | 204—195 |

HOWARD S. WILLIAMS, *Primary Examiner.*

T. TUNG, *Assistant Examiner.*